(12) United States Patent
Garay et al.

(10) Patent No.: US 8,783,042 B2
(45) Date of Patent: Jul. 22, 2014

(54) METHOD FOR OPERATING A FIRING PLANT

(75) Inventors: Mauricio Garay, Las Heras Mendoza (AR); Gianfranco Guidati, Zurich (CH); Stanka Kokanovic, Baden (CH); Stephan Torchalla, Kastl (DE)

(73) Assignee: Alstom Technology Ltd, Baden (CH)

(*) Notice: Subject to any disclaimer, the term of this patent is extended or adjusted under 35 U.S.C. 154(b) by 0 days.

(21) Appl. No.: 13/611,378

(22) Filed: Sep. 12, 2012

(65) Prior Publication Data
US 2013/0019605 A1    Jan. 24, 2013

Related U.S. Application Data

(60) Division of application No. 12/170,513, filed on Jul. 10, 2008, now abandoned, which is a continuation of application No. PCT/EP2006/068662, filed on Nov. 20, 2006.

(30) Foreign Application Priority Data

Jan. 11, 2006   (CH) ..................... 0049/06

(51) Int. Cl.
| | |
|---|---|
| F02C 9/00 | (2006.01) |
| F02C 1/00 | (2006.01) |
| F02C 9/28 | (2006.01) |
| F23R 3/34 | (2006.01) |
| F23N 5/16 | (2006.01) |
| F23N 1/00 | (2006.01) |
| F02C 9/26 | (2006.01) |

(52) U.S. Cl.
CPC ... F23R 3/34 (2013.01); F23N 5/16 (2013.01); F23N 2037/02 (2013.01); F23N 2023/48 (2013.01); F23N 1/002 (2013.01); F23C 2900/06042 (2013.01); F02C 9/26 (2013.01)
USPC ............. 60/772; 60/773; 60/774; 60/775; 60/776; 700/271; 700/287; 700/41

(58) Field of Classification Search
USPC ................ 700/271, 287, 41; 60/772–776
See application file for complete search history.

(56) References Cited

U.S. PATENT DOCUMENTS 3,925,645 A * 12/1975 Stern ............................ 700/287
(Continued)

FOREIGN PATENT DOCUMENTS

| DE | 102004052433 | 7/2005 |
|---|---|---|
| EP | 0774573 | 5/1997 |

(Continued)

OTHER PUBLICATIONS

Search Report from Swiss Patent App. No. 00049/06 (Apr. 28, 2006).

(Continued)

*Primary Examiner* — Paul Hyun
*Assistant Examiner* — Robert Eom
(74) *Attorney, Agent, or Firm* — Buchanan Ingersoll & Rooney P.C.

(57) ABSTRACT

A method for operating a firing plant with at least one combustion chamber and at least one burner, especially a gas turbine, includes an operating characteristic for operating the combustion chamber close to the lean extinction limit defined as a burner group staging ratio ($BGV_{Rich}$). Pressure pulsations ($Puls_{Actual}$) measured in the combustion chamber are processed by a filter device (2) and converted into corresponding signals ($Puls_{Actual,Filter}(t)$). An exceeding/falling short of at least one pulsation limiting value ($Puls_{Limit}$) is monitored by a monitoring device (3) and adapts a pulsation reference value ($Puls_{Ref}$) in dependence upon the monitoring. The processed pressure pulsations ($Puls_{Actual,Filter}(t)$) are then compared with the adapted pulsation reference value ($Puls_{Ref,adapt}$), and, from this, a correction value $\Delta BGV$ is determined, by which the burner group staging ratio ($BGV_{Rich}$) is corrected, and as a result operation of the firing plant close to the lean extinction limit is realized.

14 Claims, 1 Drawing Sheet

(56) References Cited

U.S. PATENT DOCUMENTS

| | | | | |
|---|---|---|---|---|
| 4,477,245 A | * | 10/1984 | Giachino et al. | 431/78 |
| 5,581,995 A | | 12/1996 | Lucenko et al. | |
| 5,719,791 A | * | 2/1998 | Neumeier et al. | 700/274 |
| 6,560,967 B1 | * | 5/2003 | Cohen et al. | 60/776 |
| 2005/0107942 A1 | | 5/2005 | Nomura et al. | |
| 2009/0037029 A1 | | 2/2009 | Garay et al. | |

FOREIGN PATENT DOCUMENTS

| | | |
|---|---|---|
| EP | 0962704 | 12/1999 |
| EP | 1205653 | 5/2002 |
| EP | 1450102 | 8/2004 |
| EP | 1533569 | 5/2005 |
| JP | 6-34136 | 2/1994 |
| JP | 6-193470 | 7/1994 |
| JP | 2004-53048 | 2/2004 |
| JP | 2005-155590 | 6/2005 |
| WO | WO2007/087907 | 8/2007 |

OTHER PUBLICATIONS

International Search Report from PCT Patent App. No. PCT/EP2006/068662 (Feb. 9, 2007).

Office Action from co-pending U.S. Appl. No. 12/170,513 dated Jun. 13, 2012.

\* cited by examiner

METHOD FOR OPERATING A FIRING PLANT

This application is a Divisional of, and claims priority under 35 U.S.C. §120 to, U.S. application Ser. No. 12/170,513, filed 10 Jul. 2008 now abandoned, which is a Continuation of, and claims priority under 35 U.S.C. §120 to, International App. No. PCT/EP2006/068662, filed 20 Nov. 2006, and claims priority therethrough under 35 U.S.C. §§119, 365 to Swiss App. No. 00049/06, filed 11 Jan. 2006, the entireties of which are incorporated by reference herein.

BACKGROUND

1. Field of Endeavor

The present invention relates to a method for operating a firing plant with at least one combustion chamber and with at least one burner for producing hot gas, especially a gas turbine, preferably in a power generating plant. The invention also relates to a firing plant with at least one combustion chamber and at least one burner for producing hot gas.

2. Brief Description of the Related Art

A firing plant, for example a gas turbine, customarily has at least one combustion chamber with at least one burner. Furthermore, a fuel supply system is always provided, by which the burners are supplied with fuel. With regard to regulations which are becoming ever stricter concerning limiting values which are to be observed for pollutant emissions, it is sought to operate the burners as close as possible to the lean extinction limit. As a result of such a lean operation, especially the creation of harmful $NO_x$ emissions can be reduced.

The influencing parameters which determine the extinction limit vary in this case during operation of a gas turbine. Such influencing parameters, for example, are boundary conditions such as the ambient temperature, the relative air humidity, the air mass flow which depends especially upon the operating state of the upstream compressor, and the composition of the fuel which is currently used, etc. The burners, with regard to their fuel feed, are frequently divided into two or more groups so that an influence can be exerted upon the equivalence ratio of the combustion process. In this case, the fuel feed to the two or more burner groups is customarily controlled in dependence upon the aforementioned factors. Since, however, not all important parameters, and especially not all changes to each time point, can be adequately taken into consideration, a predefined fuel staging ratio or burner group staging ratio is always selected with a certain safety margin to the lean extinction limit.

This safety margin is to ensure that even during a change of the individual boundary conditions, which act differently upon the stability of the combustion process, a stable operation of the individual burners is ensured. A stable operating state takes highest priority, especially in the case of power generating plants which are used for electric power generation, so that the safety margin is greater than is absolutely necessary and consequently higher $NO_x$ emissions are accepted.

SUMMARY

The present invention starts at this point. One of numerous aspect of the present invention deals with an operating method of the aforementioned type, which especially enables stable operation of the combustion chamber which is as close as possible to the lean extinction point.

Another aspect of the present invention includes controlling the fuel feed to the burners of the combustion chamber in dependence upon pressure pulsations which occur in the combustion chamber, wherein the controlling is achieved by a comparison of the pressure pulsations which occur and are conditioned in the combustion chamber with predetermined and adapted pulsation reference values. One exemplary embodiment uses the knowledge that the pressure pulsations increase as the combustion process approaches the lean extinction limit. First of all, therefore, an operating characteristic for operating the combustion chamber close to the lean extinction limit is defined or determined in the form of a burner group staging ratio, and at the same time the pressure pulsations which occur in the combustion chamber are measured and then processed by a filter device. Furthermore, a pulsation reference value, which is defined in dependence upon load, and also at least one pulsation limiting value, are defined. A monitoring device monitors pulsation exceeding/falling short of the pulsation limiting value, or the pulsation limiting values, in the process and adapts the pulsation reference value in dependence upon this monitoring. The pressure pulsations which are measured and processed in the combustion chamber are then compared with the adapted pulsation reference value and, as a result, a correction value is determined by which the operating characteristic which was defined at the beginning, i.e., the fuel feed, is corrected.

The filter device in this case has the task of reducing noise of the recorded pressure pulsation signal, as a result of which the signal quality can be significantly increased. Such improved signal quality has a positive effect upon the active control process of the operating method according to the invention. In this case the filter device can especially be designed so that it amplifies relevant signal contents, whereas it attenuates or eliminates disturbing signal contents. The increasing of the signal quality in this case can be achieved by use of an amplification factor $K_{Filter}$ and also of a time constant $T_{Filter}$.

The method according to an embodiment exemplifying principles of the invention has a closed-loop control circuit in which the pulsation reference value is dynamically adapted. By the method, therefore, the combustion chamber can be operated safely and yet very close to the lean extinction limit, as a result of which the $NO_x$ emissions can be significantly lowered. In this case, a method according to the invention can fall back on the fact that a modern combustion chamber is always equipped with a sensor system for monitoring the pressure pulsations so that this sensor system can be utilized and consequently no additional costs ensue for instrumentation or realizing a method according to the invention with regard to recording the pressure pulsations.

According to an especially advantageous exemplary embodiment, a load-dependent pulsation reference value is established which is decreased or increased by a predetermined quantity provided that, within a defined time period, a determined number of measured pressure pulsation values lie above/below the at least one predetermined pressure pulsation limiting value. If, therefore, a determined number of pulsation values above the established pulsation limiting value occur within a predefined time period, then the pulsation reference value is decreased by a predefined quantity. The adapted pulsation reference values are used in this case for a predefined time period until a renewed adaptation of the pulsation reference value is carried out.

Further features and advantages of operating methods according to the invention result from the drawings and from the associated figure description with reference to the drawings.

BRIEF DESCRIPTION OF THE DRAWINGS

Preferred exemplary embodiments of the invention are represented in the drawings and are explained in more detail in In the drawing, schematically in each case.

DETAILED DESCRIPTION OF EXEMPLARY EMBODIMENTS

Figure 1:
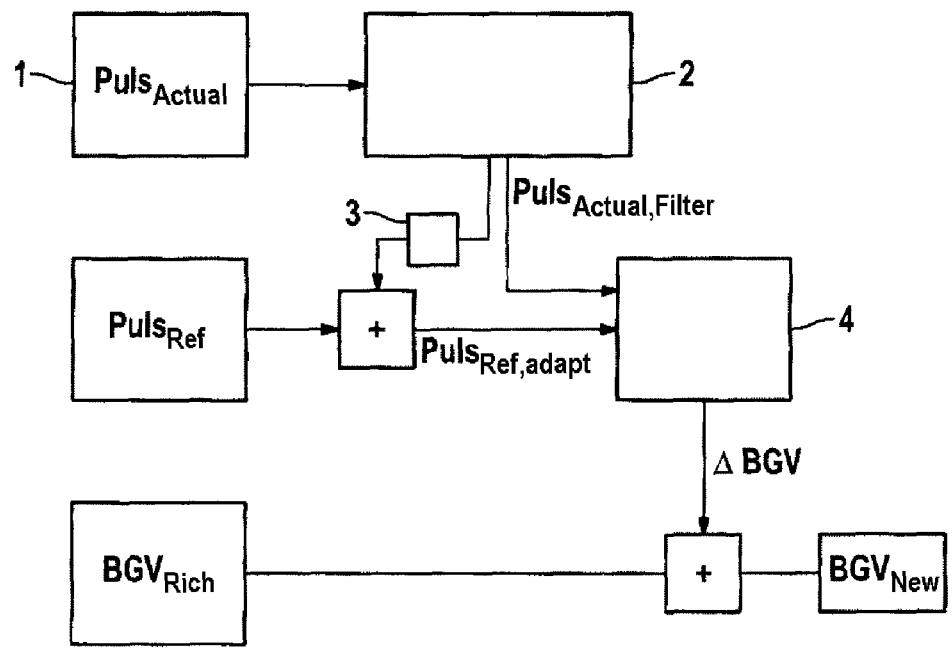
FIG. 1 shows a much schematized view of a possible sequence of the operating method according to the invention.

According to FIG. 1, a firing plant, which is not otherwise shown, with at least one combustion chamber, which is also not shown, and at least one burner for producing hot gas, has a measuring device 1 for measuring pressure pulsations $Puls_{Actual}(t)$ which converts the pressure pulsations into preferably electrical signals and transmits the signals to a filter device 2. The filter device 2 in this case processes the signals which correspond to the measured pressure pulsations $Puls_{Actual}(t)$, wherein preferably relevant signal components are amplified and irrelevant signal components, such as noise, are at least reduced. The filter device 2 can have a filter of the first order for processing the aforementioned signals, which amplifies the signals coming in from the measuring device 1 with an amplification factor $K_{Filter}$. A time constant $T_{Filter}$ can also be established in the processing of the signal, which provides the pressure pulsation signals $Puls_{Actual}(t)$ coming in from the measuring device 1 with a time component. In order to be able to take into consideration load changes of the firing plant, it is intended to define two different amplification factors $K_{Filter}$, specifically one for constant load cases and another for transient load cases. The pressure pulsation signals $Puls_{Actual,Filter}(t)$, which are processed by the filter device 2, are transmitted to an evaluating/control unit 4 and in this, or by this, are compared together with an adapted pulsation reference value $Puls_{Ref,adapt}$.

The adapted pulsation reference value $Puls_{Ref,adapt}$ in this case is dependent upon load and is to bring about the firing plant being able to be operated as lean as possible, as a result of which a discharge of $NO_x$ emissions can be reduced. Determination of the adapted pulsation reference value $Puls_{Ref,adapt}$ in this case is carried out as follows:

First of all, a pulsation reference value $Puls_{Ref}$ is defined or established in dependence upon the relative load. The predefined pulsation reference value $Puls_{Ref}$ is now monitored by a monitoring device 3 and at the same time a corrected pulsation reference value $Puls_{Ref,adapt}$ is determined in dependence upon the monitoring by the monitoring device 3. The adaptation of the pulsation reference value $Puls_{Ref}$ in this case is carried out by the monitoring device 3 comparing the measured and preferably filtered pressure pulsations $Puls_{Actual}(t)$ or $Puls_{Actual,Filter}(t)$ with the predefined pulsation reference value $Puls_{Ref}$, and in the case of exceeding or falling short of at least one pulsation limiting value $Puls_{Limit}$, correspondingly increases or decreases, and consequently adapts, the pulsation reference value $Puls_{Ref}$. For correction or adaptation of the established pulsation reference value $Puls_{Ref}$, within a defined time period, a determined number of pressure pulsation values $Puls_{Actual}(t)$ must lie above or below the at least predetermined pulsation limiting value $Puls_{Limit}$ accordingly.

From the two input values, specifically the measured and filtered pressure pulsations $Puls_{Actual,Filter}$ on the one hand and the adapted pulsation reference value $Puls_{Ref,adapt}$ on the other hand, the evaluating/control unit 4 now determines a correction value $\Delta BGV$ by which the defined burner group staging ratio $BGV_{Rich}$ which was defined at the beginning, i.e., the operating characteristic, is corrected. The determination of the correction value $\Delta BGV$ in this case is carried out by comparison of the measured and filtered pressure pulsations $Puls_{Actual,Filter}$ with the adapted pulsation reference value $Puls_{Ref,adapt}$. The evaluating/control unit 4 in this case for example can be formed as a proportional/integral controller, or as a purely proportional controller, or as a purely integral controller, and can operate with an amplification factor $K_{PI}$ and also with a time constant $T_{TI}$ which are also defined in dependence upon the relative load, like the established reference value $Puls_{Ref}$. The original burner group staging ratio $BGV_{Rich}$ is corrected by the correction value $\Delta BGV$ so that a burner group staging ratio $BGV_{New}$, which is corrected and better adapted to the new boundary conditions, is achieved.

Figure 2:
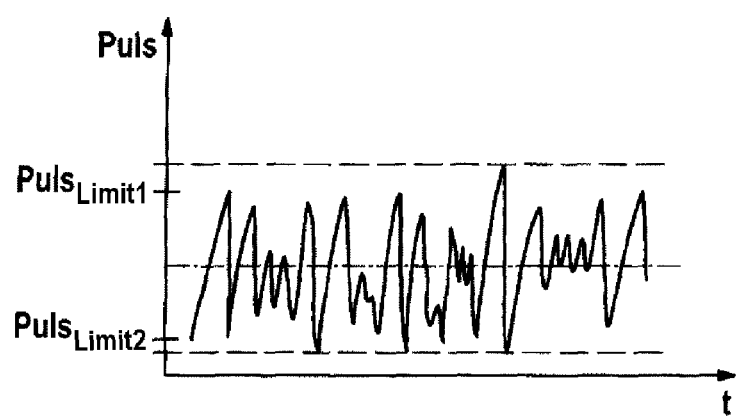
FIG. 2 shows a diagram, in which the pattern of pressure pulsations is plotted.

According to FIG. 2, the measured pressure pulsations $Puls_{Actual}$ are plotted over time t. In this case, an upper pulsation limiting value $Puls_{Limit1}$ and a lower pulsation limiting value $Puls_{Limit2}$ can be established, which, in the case of exceeding or falling short of, brings about an adaptation of the pulsation reference value $Puls_{Ref}$ by the monitoring device 3, provided that a determined number of pulsation values $Puls_{Actual}$ or $Puls_{Actual,Filter}$ within a defined time period lie below the pulsation limiting value $Puls_{Limit2}$ or above the upper pulsation limiting value $Puls_{Limit1}$. As a result, a region between $Puls_{Limit1}$ and $Puls_{Limit2}$ is therefore defined, in which no adaptation of the pulsation reference value $Puls_{Ref}$ is carried out. It is also conceivable that only one pulsation limiting value $Puls_{Limit}$ is defined, which, in the case of exceeding, and also in the case of falling short of this limiting value, brings about adaptation of the pulsation reference value $Puls_{Ref}$. A region in which no adaptation of the pulsation reference value $Puls_{Ref}$ is carried out is therefore not provided in the case of such an embodiment.

A further variant, in which an adaptation of the pulsation reference value $Puls_{Ref}$ is carried out, in case within a shorter time period few pulsation values $Puls_{Actual}$ lie above a higher pulsation limiting value, is also conceivable. For adaptation, therefore, either a certain number of pulsation values $Puls_{Actual}$ which, within a certain time interval, exceed the upper pulsation limiting value $Puls_{Limit1}$, are necessary, or a lower number, in comparison to it, of pulsation values $Puls_{Actual}$ which, within a shorter time period lie above a pulsation limiting value, which is higher than the upper pulsation limiting value $Puls_{Limit1}$, are necessary. The same can apply in a corresponding way to the lower pulsation limiting value $Puls_{Limit2}$.

Methods embodying principles of the present invention make it possible to operate firing plants close to the lean extinction limit and, as a result, to significantly lower the NO emissions. At the same time, however, the operating characteristic of the burner group staging ratio ($BGV_{Rich}$) is operated with a certain safety margin to the lean extinction limit so that a stable operation of the burners is ensured. This safety margin, however, is significantly reduced by the described closed-loop control concept.

LIST OF DESIGNATIONS

1 Measuring device
2 Filter device
3 Monitoring device
4 Evaluating and control unit
$BGV_{Rich}$ Burner group staging ratio, operating characteristic
$BGV_{New}$ Burner group staging ratio after adaptation
$\Delta BGV$ Burner group staging ratio, correction value $K_{Filter}$ Amplification factor used by the filter device 2
$K_{PI}$ Amplification factor used by the evaluating/control unit 4
$T_{Filter}$ Time constant used by the filter device 2
$T_{PI}$ Time constant used by the evaluating/control unit 4
$Puls_{Limit}$ Pulsation limiting value
$Puls_{Limit1}$ Upper pulsation limiting value
$Puls_{Limit2}$ Lower pulsation limiting value
$Puls_{Actual}$ Pressure pulsations measured in the combustion chamber
$Puls_{Ref}$ Established pulsation reference value
$Puls_{Actual,Filter}$ Pressure pulsations measured and then filtered in the combustion chamber
$Puls_{Ref,adapt}$ Adapted or corrected pulsation reference value While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A method for operating a firing plant having at least one combustion chamber and at least one burner, the firing plant for producing hot gas, the method comprising:
    defining an operating characteristic for operating the combustion chamber close to a lean extinction limit, in the form of a burner group staging ratio ($BGV_{Rich}$);
    measuring, in the combustion chamber, pressure pulsations ($Puls_{Actual}(t)$);
    converting said measured pressure pulsations ($Puls_{Actual}(t)$) into corresponding signals;
    monitoring exceeding or falling short of at least one pulsation limiting value ($Puls_{Limit}$);
    adapting a pulsation reference value ($Puls_{Ref}$) in dependence upon said monitoring to form an adapted pulsation reference value ($Puls_{Ref,adapt}$);
    processing said corresponding signals by a filter device to produce processed pressure pulsations ($Puls_{Actual,Filter}(t)$);
    comparing the processed pressure pulsations ($Puls_{Actual,Filter}(t)$) to the adapted pulsation reference value ($Puls_{Ref,adapt}$);
    determining a correction value ($\Delta BGV$) from said comparing, wherein said determining the correction value ($\Delta BGV$) comprises determining the dependence of the correction value ($\Delta BGV$) on at least one amplification factor ($K_{PI}$); and
    correcting the burner group staging ratio ($BGV_{Rich}$) based on said correction value ($\Delta BGV$).

2. The method as claimed in claim 1, wherein said determining the correction value ($\Delta BGV$) further comprises determining the dependence of the correction value ($\Delta BGV$) on at least one time constant ($T_{PI}$).

3. The method as claimed in claim 2, further comprising:
    determining time constants ($T_{PI}$) for constant load cases and for transient load cases.

4. The method as claimed in claim 1, further comprising:
    establishing a load-dependent pulsation reference value ($Puls_{Ref}$), and
    decreasing or increasing, by a predetermined quantity, the load-dependent pulsation reference value ($Puls_{Ref}$) when a predetermined number of pulsation values lie above or below the predetermined pulsation limiting value ($Puls_{Limit}$) within a predefined time period.

5. The method as claimed in claim 1, comprising performing said method in a closed-loop control circuit.

6. The method as claimed in claim 1, wherein the firing plant comprises a gas turbine.

7. The method as claimed in claim 6, wherein the gas turbine comprises a turbine of a power generating plant.

8. The method as claimed in claim 1, further comprising, before said defining step, providing a firing plant comprising:
    at least one combustion chamber;
    at least one burner for producing hot gas;
    wherein the burner group staging ratio ($BGV_{Rich}$) is defined for operating the combustion chamber close to the lean extinction limit;
    a measuring device configured and arranged to measure the pressure pulsations ($Puls_{Actual(t)}$) in the combustion chamber;
    a monitoring device configured and arranged to monitor the level of at least one pulsation limiting value ($Puls_{Limit}$), to adapt a pulsation reference value ($Puls_{Ref}$) in dependence upon the level to form the adapted pulsation reference value ($Puls_{Ref,adapt}$), and to generate at least one signal corresponding to the measured pressure pulsations ($Puls_{Ref(t)}$);
    a filter device configured and arranged to process the at least one signal corresponding to the measured pressure pulsations ($Puls_{Ref(t)}$) and generate processed pressure pulsations ($Puls_{Actual,Filter(t)}$); and
    a control unit configured and arranged to compare the processed pressure pulsations ($Puls_{Actual,Filter(t)}$) with the adapted pulsation reference value ($Puls_{Ref,adapt}$) and determine the correction value ($\Delta BGV$) by which the burner group staging ratio ($BGV_{Rich}$) can be corrected.

9. The method as claimed in claim 8, wherein the filter device comprises a first order filter.

10. The method as claimed in claim 8, wherein the monitoring device is further configured and arranged change the pulsation reference value ($Puls_{Ref}$) by a predetermined quantity when, within a defined time period, a predetermined number of pulsation values are outside the at least one pulsation limiting value ($Puls_{Limit}$).

11. The method as claimed in claim 8, wherein the control unit comprises a proportional/integral controller, a proportional controller, or an integral controller.

12. The method as claimed in claim 1, wherein the pulsation reference value ($Puls_{Ref}$) is dependent upon load.

13. The method as claimed in claim 1, wherein said at least one amplification factor ($K_{PI}$) is dependent upon load.

14. The method as claimed in claim 1, comprising:
    different amplification factors ($K_{PI}$), which are taken into consideration for constant load cases and for transient load cases.

* * * * *